United States Patent
Kojima

(10) Patent No.: US 9,905,263 B2
(45) Date of Patent: Feb. 27, 2018

(54) MAGNETIC DISK DEVICE AND WRITE PROCESSING METHOD

(71) Applicant: Kabushiki Kaisha Toshiba, Minatu-ku, Tokyo (JP)

(72) Inventor: Shuuichi Kojima, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 35 days.

(21) Appl. No.: 15/087,492

(22) Filed: Mar. 31, 2016

(65) Prior Publication Data

US 2017/0200470 A1    Jul. 13, 2017

Related U.S. Application Data

(60) Provisional application No. 62/276,577, filed on Jan. 8, 2016.

(51) Int. Cl.
| | | |
|---|---|---|
| G11C 29/00 | (2006.01) | |
| G11B 20/18 | (2006.01) | |
| G06F 11/10 | (2006.01) | |
| G06F 3/06 | (2006.01) | |
| G11B 5/55 | (2006.01) | |

(52) U.S. Cl.
CPC .......... G11B 20/1833 (2013.01); G06F 3/064 (2013.01); G06F 3/0619 (2013.01); G06F 3/0676 (2013.01); G06F 11/1076 (2013.01); G11B 5/5547 (2013.01)

(58) Field of Classification Search
CPC ............. G11B 20/1833; G06F 11/1076; G06F 3/0619; G06F 3/064; G06F 3/0676
See application file for complete search history.

(56) References Cited

U.S. PATENT DOCUMENTS

| | | |
|---|---|---|
| 5,729,408 A | 3/1998 | Kikitsu |
| 7,533,330 B2 | 5/2009 | Anderson et al. |
| 2010/0153669 A1 | 6/2010 | Yoshida et al. |
| 2014/0281793 A1 | 9/2014 | Patapoutian |
| 2016/0148625 A1* | 5/2016 | Zhu .......................... G11B 5/09 360/48 |
| 2017/0147438 A1* | 5/2017 | Wu ...................... G06F 11/1096 |

* cited by examiner

Primary Examiner — Sam Rizk
(74) Attorney, Agent, or Firm — White & Case LLP

(57) ABSTRACT

According to one embodiment, a magnetic disk device includes a disk including a first recording area, a head includes a write head configured to write data to the disk, and a read head configured to read data from the disk, and a controller configured to set particular areas in same circumferential positions on tracks of the first recording area, and to write, to the respective particular areas, parity data based on data read from areas other than the particular areas.

16 Claims, 10 Drawing Sheets

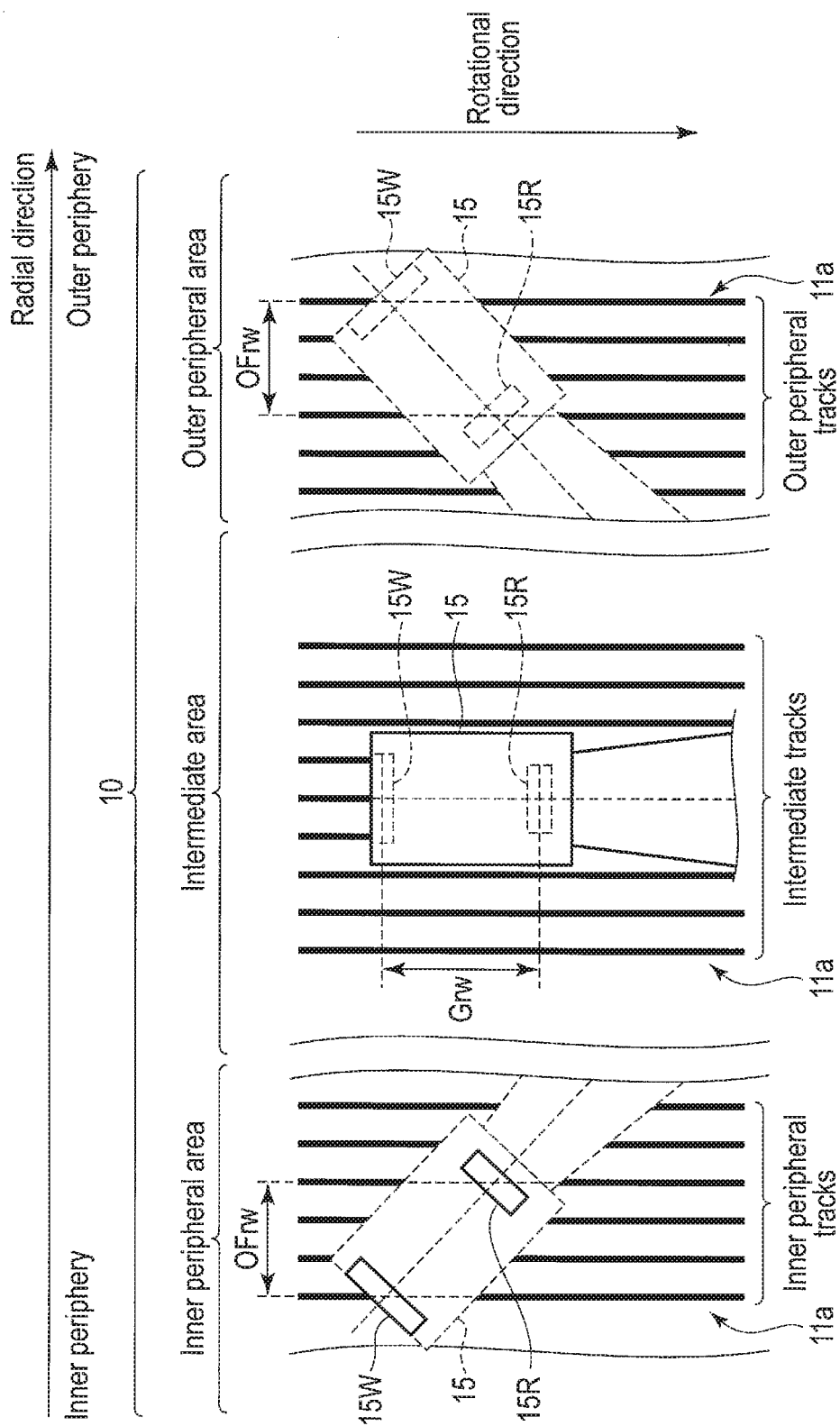
F I G. 2A

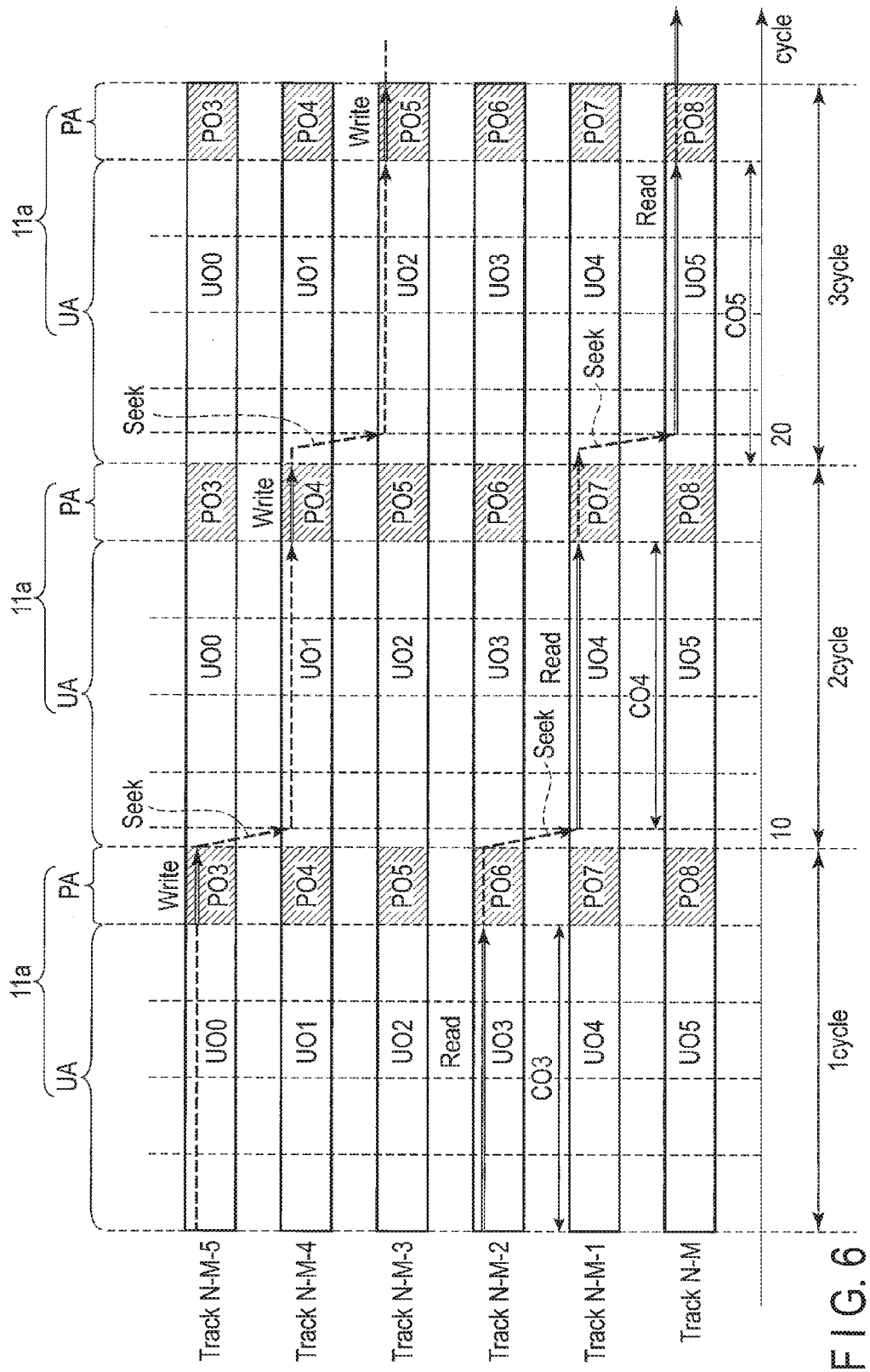
F I G. 6

MAGNETIC DISK DEVICE AND WRITE PROCESSING METHOD

CROSS-REFERENCE TO RELATED APPLICATIONS

This application claims the benefit of U.S. Provisional Application No. 62/276,577, filed Jan. 8, 2016, the entire contents of which are incorporated herein by reference.

FIELD

Embodiments described herein relate generally to a magnetic disk device and a write processing method.

BACKGROUND

A magnetic disk device generates parity data for write data by an exclusive OR (XOR) operation based on write data. In a magnetic disk device that does not employ the Shingled Magnetic Recording (SMR) system, if parity data is added to write data by On-The-Fly, performance may be adversely affected. In this magnetic disk device, a system in which parity data is added to write data in the background is effective in avoiding that.

When adding parity data to write data in the background, the magnetic disk device reads write data from a particular track, and generates parity data based on the read write data. After that, it writes the generated parity data to a parity sector on the same track as the read write data. At this time, a rotational delay may occur before the parity data is written to the parity sector.

Moreover, in the magnetic disk, if valid parity data is stored in the parity sector, a sector wherein a read error has occurred can be recovered by performing an XOR operation of the write data of sectors other than the sector with the read error, and the valid parity data. In contrast, if no valid parity data is stored in the parity sector, the read-error sector cannot be recovered.

In view of the above, there is a demand for efficiently updating the parity sector to have valid parity data.

BRIEF DESCRIPTION OF THE DRAWINGS

FIG. 2A is a schematic view showing position examples of a head during write processing of parity data.

FIG. 6 is a schematic view showing an example of a sequential read operation.

DETAILED DESCRIPTION

In general, according to one embodiment, a magnetic disk device comprises a disk including a first recording area; a head comprising a write head configured to write data to the disk, and a read head configured to read data from the disk; and a controller configured to set particular areas in same circumferential positions on tracks of the first recording area, and to write, to the respective particular areas, parity data based on data read from areas other than the particular areas.

The embodiment will be described with reference to the accompanying drawings.

Embodiment

Figure 1:
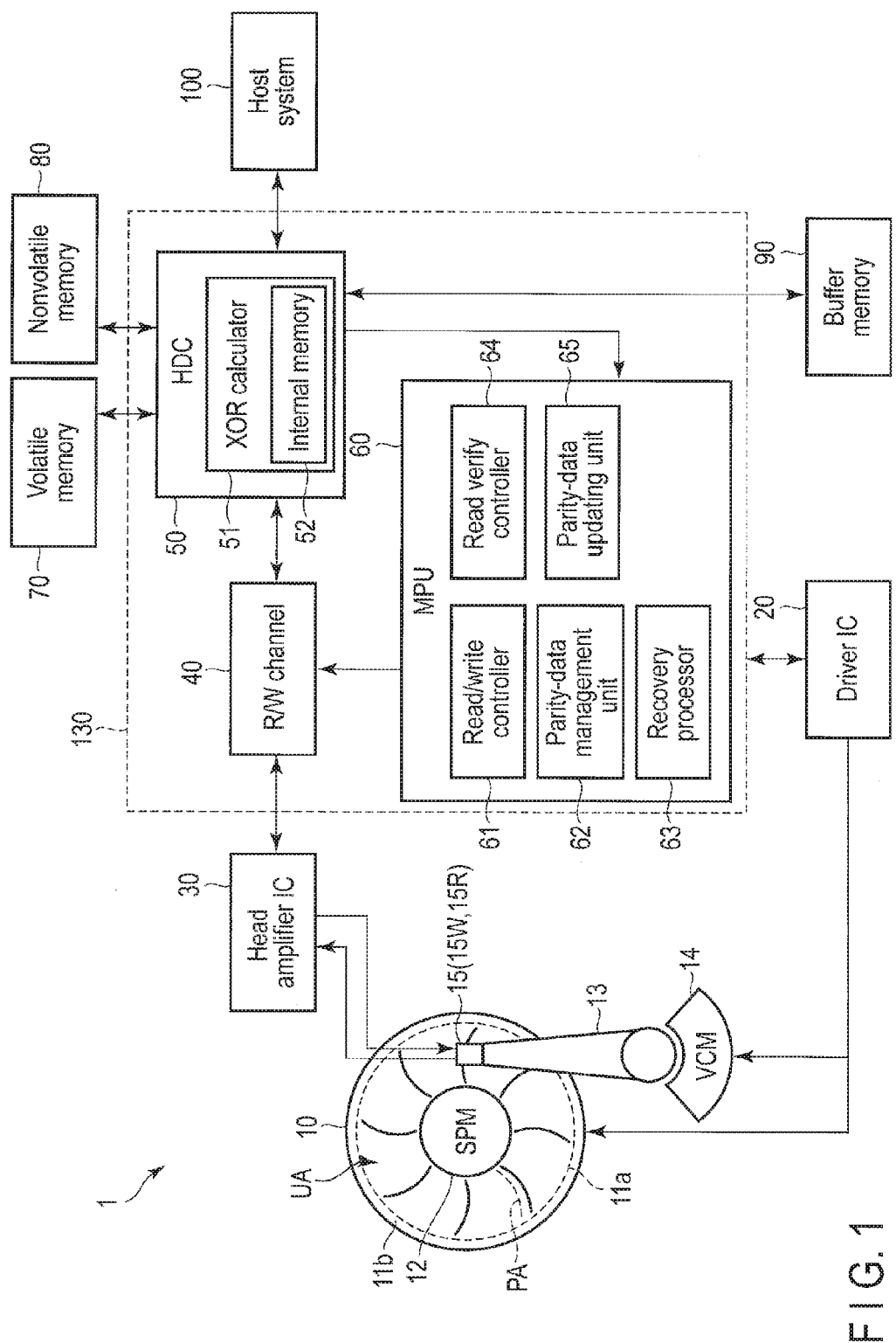
FIG. 1 is a block diagram showing the configuration of a magnetic disk device according to an embodiment.

FIG. 1 is a block diagram showing the configuration of a magnetic disk device 1 according to an embodiment.

The magnetic disk device 1 comprises a head-disk assembly (HDA) described later, a driver IC 20, a head amplifier integrated circuit (hereinafter, referred to as a head amplifier IC) 30, a volatile memory 70, a nonvolatile memory 80, a buffer memory (buffer) 90, and a system controller 130 formed of a one-chip integrated circuit. Moreover, the magnetic disk device 1 is connected with a host system (host) 100.

The HDA comprises a magnetic disk (hereinafter, referred to as a disk) 10, a spindle motor (SPM) 12, an arm 13 with the head 15 mounted thereon, and a voice coil motor (VCM) 14. The disk 10 is rotated by the spindle motor 12. The arm 13 and the VCM 14 constitute an actuator. The actuator moves the head 15 mounted on the arm 13 to a particular position on the disk 10 by the rotation of the VCM 14. Two or more disks 10 and heads may be employed.

A recording area 11a, which can be used by a user, and a system area 11b, to which data necessary for system management is written, are allocated to the disk 10. The recording area 11a includes user-data recording areas UA and parity areas PA.

The head 15 comprises a slider as a main body, and a write head 15W and a read head 15R mounted on the slider. The read head 15R is configured to read data recorded on the disk 10. The write head 15W is configured to write data to the disk 10.

The driver IC 20 controls the SPM 12 and the VCM 14 under control of the system controller 130 (more specifically, an MPU 60 described later in detail).

The head amplifier IC 30 includes a read amplifier and a write driver. The read amplifier amplifies a read signal read by the read head 15R, and transmits it to a read/write (R/W) channel 40. The write driver transmits, to the write head 15W, a write current corresponding to write data output from the R/W channel 40.

The volatile memory 70 is a semiconductor memory having its data lost when the supply of electric power is interrupted. The volatile memory 70 stores, for example, data required for processing each part of the magnetic disk device 1. The volatile memory 70 is, for example, a synchronous dynamic random access memory (SDRAM).

The nonvolatile memory 80 is a semiconductor memory having its data held even if the supply of electric power is interrupted. The nonvolatile memory 80 is a flash read only memory (flash ROM: FROM), for example.

The buffer memory 90 is a semiconductor memory that temporarily holds, for example, data transmitted between the disk 10 and the host system 100. The buffer memory 90 may be formed integral with the volatile memory 70 as one body. The buffer memory 90 is, for example, a dynamic random access memory (DRAM), a static random access memory (SRAM), an SDRAM, a ferroelectric random access memory (FeRAM), or a magnetoresistive random access memory (MRAM).

The system controller (controller) 130 is realized using, for example, a large-scale integrated circuit (LSI) that comprises a plurality of elements integrated on a single chip and is called a System-on-a-Chip (SoC). The system controller 130 comprises the read/write (R/W) channel 40, the hard disk controller (HDC) 50, and the microprocessor (MPU) 60.

The R/W channel 40 performs signal processing of read data and write data.

The HDC 50 controls data transfer between the host system 100 and the R/W channel 40 under control of the MPU 60. The HDC 50 includes an XOR calculator 51.

The XOR calculator 51 includes an internal memory 52. The XOR calculator 51 performs an exclusive OR (XOR) operation, and generates an XOR operation value (hereinafter, referred to as parity data or an operation value) as the result of the XOR operation. The XOR calculator 51 stores the generated parity data in the internal memory 52, and outputs the stored parity data at a particular time. The XOR calculator 51 may use the volatile memory 70 or the buffer memory 90, in place of the internal memory 52.

For instance, the XOR calculator 51 performs an XOR operation based on each user data item (hereinafter, referred to simply as data) transmitted from the host 100 or the disk 10, and generates parity data as a calculation result of the XOR operation. When generating parity data, the XOR calculator 51 performs an XOR operation for each data item stored in a sector of a track of the disk 10. The XOR calculator 51 stores the generated parity data in its internal memory. The XOR calculator 51 outputs the stored parity data in accordance with a request from the MPU 60.

In addition, the XOR calculator 51 may be incorporated in the R/W channel 40 or the HDC 50, or may be executed on firmware by the MPU 60.

The MPU 60 is a main controller that controls each part of the magnetic disk device 1. The MPU 60 controls, for example, the VCM 14 through the driver IC 20, and performs servo control for, for example, positioning the head 15. Moreover, the MPU 60 controls an operation of writing data to the disk 10, and performs control for selecting the storage destination of write data transmitted from the host system 100.

The MPU 60 comprises a read/write controller 61, a parity-data management unit 62, a recovery processor 63, a read verify controller 64, and a parity-data updating unit 65. The MPU 60 performs the processing of each unit on the firmware.

The read/write controller 61 controls read/write of data from/to the disk 10 in accordance with a command from the host 100. That is, the read/write controller 61 controls the read/write operations of the head 15.

The parity-data management unit 62 performs an XOR operation on the data of each sector unit, using the XOR calculator 51, and generates parity data as the result of the XOR operation. The parity-data management unit 62 writes the generated parity data to a particular area in the parity area PA of the recording area 11a. The parity-data management unit 62 can write parity data, associated with a particular track, to another track corresponding to the position of the write head 15W positioned based on the position of the read head 15R that reads the particular track. Hereinafter, a particular area of the recording area 11a, where parity data is written, will be referred to as a parity sector. The parity-data management unit 62 manages whether each parity data item is a valid parity data item, using, for example, a management table.

If a sector (read error sector) that cannot be read has occurred during a normal read operation, the recovery processor 63 can recover the data of the read error sector, using valid parity data.

If a read error sector has occurred in a particular track, the recovery processor 63 refers to the management table to acquire valid parity data for the particular track including the read error sector. The recovery processor 63 recovers the data of the read error sector by performing an XOR operation on the data of sectors other than the read error sector in a single track, and the valid parity data. If no valid parity data is stored in the parity sector, the recovery processor 63 cannot recover the read error sector.

When there is no command processing, for example, during an idling state, the read verify controller 64 scans a particular area on the disk 10, and performs processing (read verify processing) of detecting a sector that stores data that is not degraded parity data. At this time, the read verify controller 64 sets the LBA (start LBA) of a sector to be read first in the read verify processing and the LBA (last LBA) of a sector to be read last in the read verify processing, or the length (LBA length) of the read sector, thereby performing sequential reading from the start LBA to the last LBA. Below, "scan" may also be expressed as "read."

When detecting a sector storing degraded data during the read verify processing, the read verify controller 64 directs execution of rewrite processing (data refreshment processing) of a track having this sector.

During the read verify processing, the parity-data updating unit 65 refers to, for example, the parity data management table, thereby determining a track (hereinafter, referred to as a to-be-updated track) without valid parity data, and overwriting parity data associated with this track. Hereinafter, overwrite update will be also referred to simply as update. Further, it may also be expressed as write including the meaning of update.

During the read verify processing, the parity-data updating unit 65 refers to, for example, the parity data management table, thereby determining a to-be-updated track, and reading write data from this track. The parity-data updating unit 65 uses the XOR calculator 51, thereby generating parity data based on the write data of the to-be-updated track. When generating parity data, the XOR calculator 51 performs an XOR operation on the data stored in each sector of the to-be-updated track. The parity-data updating unit 65 can update parity data associated with the to-be-updated track into newly generated parity data, using the write head 15W positioned based on the position of the read head 15R that reads the to-be-updated track.

After the parity data is updated, the parity-data updating unit 65 sets a flag indicating that the parity data associated with the to-be-updated track is valid. For instance, the parity-data updating unit 65 sets a flag indicating that the parity data is valid, for management data in the parity data management table that corresponds to the updated parity data.

(Write Processing of a Parity Sector)

A description will be given of write processing of a parity sector with reference to some drawings.

Figure 2B:
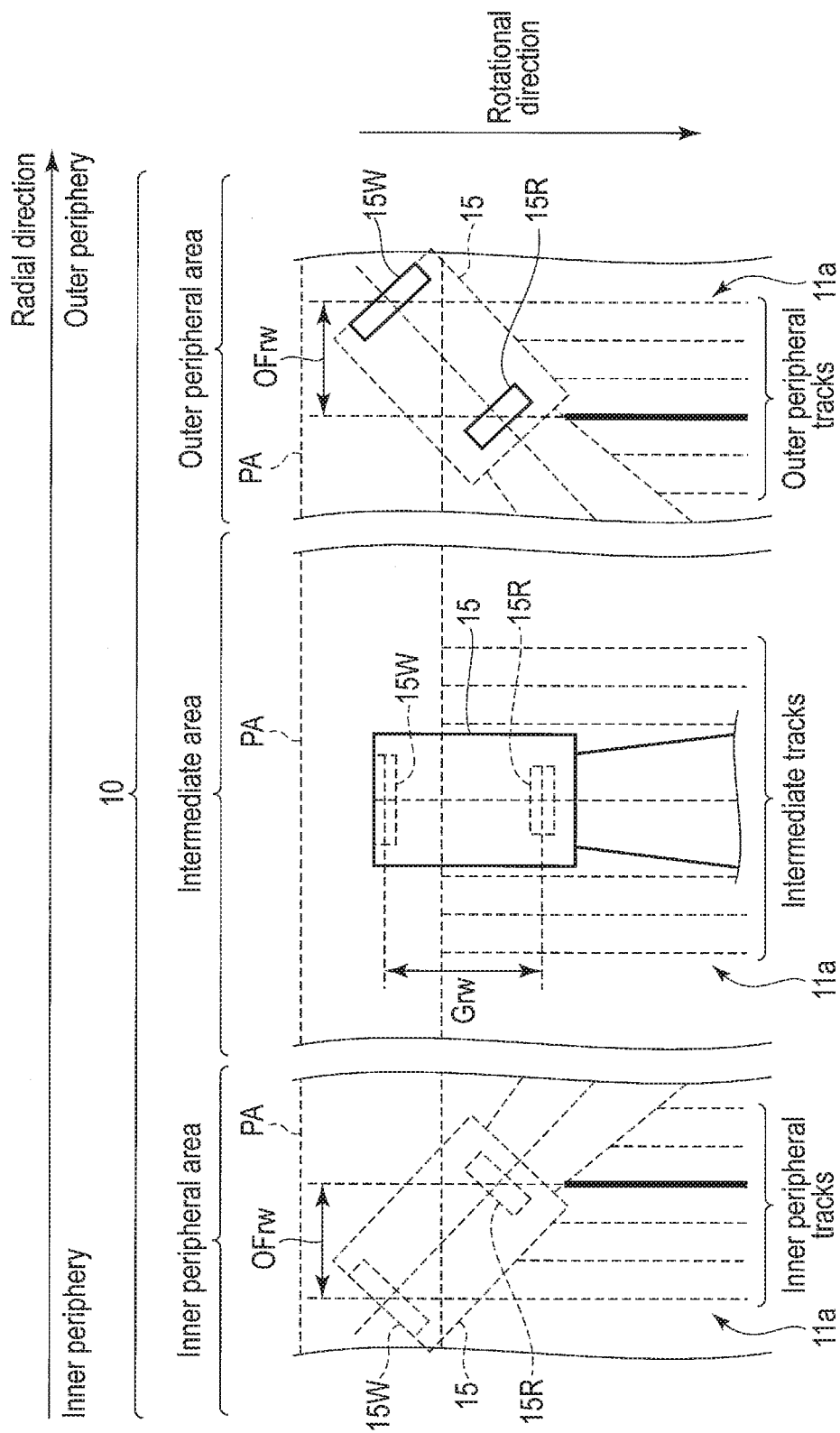
FIG. 2B is a schematic view showing position examples of a head during write processing of parity data.

FIGS. 2A and 2B are schematic diagrams showing examples of positions of the head 15 during the write processing of parity data. As shown in FIGS. 2A and 2B, the recording area 11a of the disk 10 is classified into three areas—an outer peripheral area as an outer-peripheral particular area, an inner peripheral area as an inner-peripheral particular areas, and an intermediate area between the outer and inner peripheral areas. Further, tracks included in the outer peripheral area will be referred to as outer peripheral tracks, tracks included in the intermediate area will be referred to as intermediate tracks, and tracks included in the inner peripheral area will be referred to as inner peripheral tracks.

FIG. 2A shows the positions of the head 15 in the inner peripheral area, the intermediate area and the outer peripheral area of the recording area 11a of the disk 10. FIG. 2B shows the positions of the head 15 in the inner peripheral area, the intermediate area and the outer peripheral area during write processing of the parity area PA. As shown in FIGS. 2A and 2B, the write head 15W and read head 15R of the head 15 are positioned with a particular distance (read/write gap Grw) interposed therebetween.

As shown in FIG. 2A, in the inner and outer peripheral areas of the recording area 11a, a read/write offset (hereinafter, referred to simply as an RW offset) OFrw occurs between the paths of the write head 15W and the read head 15R along the periphery of the disk 10 (hereinafter, referred to simply as a peripheral direction). The RW offset OFrw is assumed to be a distance (hereinafter, referred to simply as a radial distance) along the radius of the disk 10.

Therefore, when performing write processing after reading a particular inner or outer peripheral track using the read head 15R, the MPU 60 can perform write processing, using the write head 15W positioned based on the particular RW offset OFrw, as is shown in FIG. 2B.

For instance, when performing, during read verify processing, write processing of parity data after reading a particular outer peripheral track using the read head 15R, the MPU 60 can write, using the write head 15W, the parity data to a portion of the parity area PA located radially away from the particular outer peripheral track by the particular RW offset OFrw.

Similarly, when performing, during read verify processing, write processing of parity data after reading a particular inner peripheral track using the read head 15R, the MPU 60 can write the parity data to a portion of the parity area PA located radially away from the particular inner peripheral track by the particular RW offset OFrw.

Figure 3:
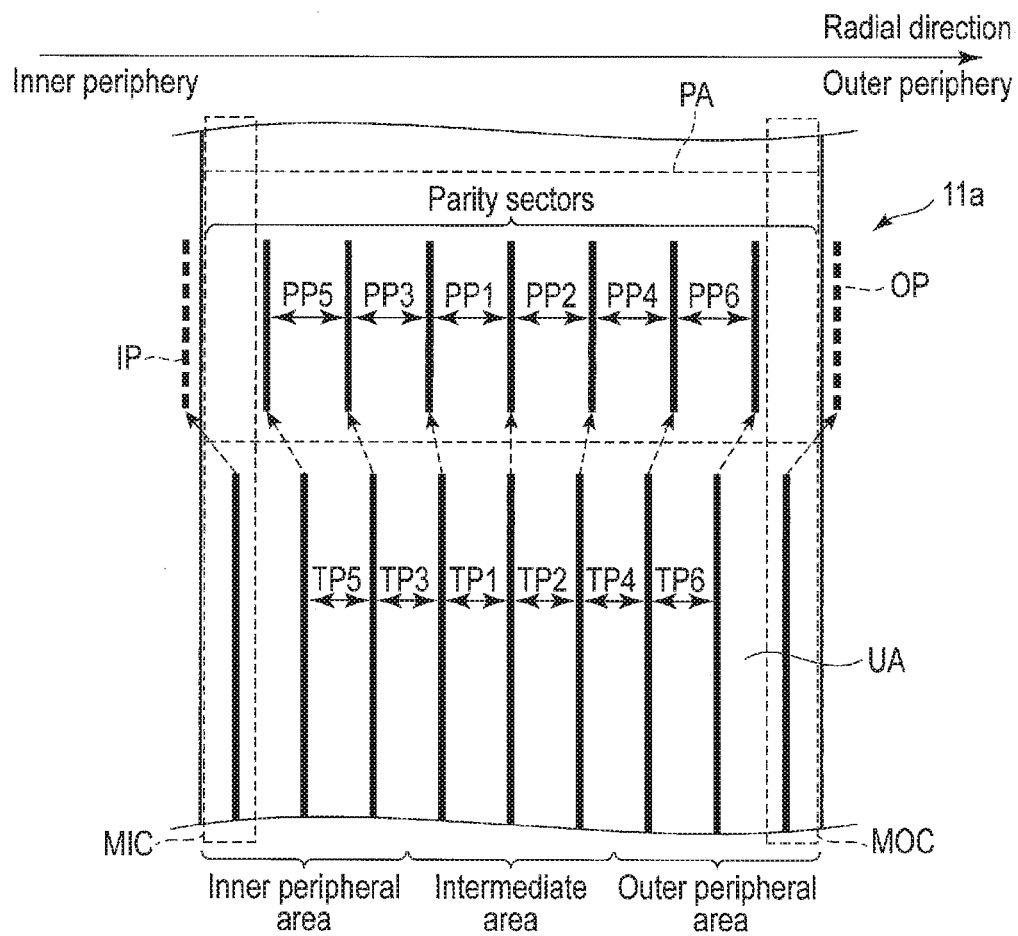
FIG. 3 is a schematic view showing the positional relationship between tracks and parity sectors along the radius.

FIG. 3 is a schematic view showing the positional relationship between tracks and parity sectors along the radius.

In FIG. 3, the solid lines included in the user-data area UA indicate the paths (hereinafter, referred to simply as tracks) of respective track centers, and the solid lines included in the parity area PA indicate the paths (hereinafter, referred to simply as parity sectors) of the respective centers of parity sectors. In FIG. 3, parity sectors corresponding to the tracks are shown such that they follow the broken-line arrows extended from the respective tracks.

In FIG. 3, it is assumed that when the read head 15R is positioned on a particular track in a portion of the user-data area UA located other than an outermost peripheral area MOC and an innermost peripheral area MIC, the write head 15W is positioned on a particular parity sector of the parity area PA that follows the arrow of the particular track. That is, the particular parity sector is a portion of the parity area PA radially away from the particular track by a length corresponding to the RW offset.

TP1, TP2, TP3, TP4, TP5 and TP6 represent examples of pitches between adjacent tracks. Further, PP1, PP2, PP3, PP4, PP5 and PP6 represent examples of pitches between adjacent parity sectors.

As shown in FIG. 3, each of radial pitches PP1 to PP6 of the adjacent parity sectors will change in accordance with the skew angle of the head 15. Pitches PP1 to PP6 of the adjacent parity sectors slightly increase from the intermediate area to the inner peripheral area, and from the intermediate area to the outer peripheral area. That is, pitches PP5 and PP6 are slightly greater than pitches PP1 and PP2.

Moreover, radial pitches PP1 to PP6 of the adjacent parity sectors are slightly greater than pitches TP1 to TP6 of the adjacent tracks. Because of this, the influence of interference between parity data is smaller than that of interference between track write data.

In FIG. 3, the area MOC is the outermost peripheral portion (area) (hereinafter, referred to as the outermost peripheral area MOC) of the outer peripheral area of the recording area 11a, and the area MIC is the innermost peripheral portion (area) (hereinafter, referred to as the innermost peripheral area MIC) of the inner peripheral area of the recording area 11a. Further, OP represents a parity sector that may be provided in a non-recording zone radially outside the recording area 11a, and IP represents a parity sector that may be provided in a non-recording zone radially inside the recording area 11a.

The outermost peripheral area MOC and the innermost peripheral area MIC are assumed to be non-recording zones outside the recording area 11a, where the write head 15W is positioned when head 15R is positioned on a particular outer peripheral track and a particular inner peripheral track, respectively. Accordingly, the ranges of the outermost peripheral area MOC and the innermost peripheral area MIC vary in accordance with the size of the read/write gap Grw.

If determining that the write head 15W is positioned within the recording area 11a, with the read head 15R controlled to position on a particular track, the MPU 60 writes parity data, read by the read head 15R, to a parity sector on the radial path of the write head 15W that is positioned based on the position of the read head 15R.

At this time, if determining that the write head 15W is deviated from a parity sector corresponding to the particular track, with the read head 15R positioned on the particular track, the MPU 60 can also adjust the position of the write head 15W to the parity sector corresponding to the particular track.

For example, when reading a particular track in a portion of the user-data area UA other than the outermost and innermost peripheral areas MOC and MIC, the MPU 60 determines that the write head 15W is positioned within the recording area 11a, and can perform write processing on a particular parity sector in which the write head 15W is positioned.

In FIG. 3, when the read head 15R is positioned on a particular outer peripheral track in the outer peripheral area, the MPU 60 writes the parity data of the particular outer peripheral track with the read head positioned, to a particular parity sector located outside the particular outer peripheral track.

Similarly, when the read head 15R is positioned on a particular inner peripheral track in the inner peripheral area, the MPU 60 writes the parity data of the particular inner peripheral track with the read head positioned, to a particular parity sector located inside the particular inner peripheral track.

Similarly, when the read head 15R is positioned on a particular intermediate track in the intermediate area, the MPU 60 writes parity data to a particular parity sector as a substantial extension of the particular intermediate track with the read head positioned.

In addition, since the MPU 60 reads a parity sector only in a particular case of, for example, recovering data, it can perform a normal read operation on each track even when the tracks are not extensions of the respective parity sectors unlike the case of FIG. 3.

If determining that the write head 15W is positioned in a non-recording zone outside the recording area 11*a*, with the read head 15R positioned on a particular track, the MPU 60 writes parity data, associated with the write data of the particular track, to an arbitrary nonvolatile storage area other than the parity sectors (hereinafter, referred to as a nonvolatile storage area), such as the system area 11*b* or the nonvolatile memory 80.

Further, if determining, referring to the management data of each sector, that a parity sector, to which generated parity data is to be written, is a defective sector, the MPU 60 writes the generated parity data to an arbitrary nonvolatile storage area. The management data of each sector indicates, for example, a defective sector in the storage area 11*a*. The management data of each sector is stored in an arbitrary nonvolatile storage area, and is read to the volatile memory 70.

In FIG. 3, if the read head 15R is positioned on a particular outer peripheral track in the outermost peripheral area MOC, the MPU 60 determines that the write head 15W is positioned in a non-recording zone outside the recording area 11*a*, for example, on the parity sector OP. In this case, the MPU 60 writes the parity data of the particular outer peripheral track to another nonvolatile storage area, without writing the same to the parity sector OP located outside the recording area 11*a*.

In addition, when the read head 15R is positioned on a particular inner peripheral track in the innermost peripheral area MIC, the MPU 60 determines that the write head 15W is positioned in a non-recording area inside the recording area, for example, on the parity sector IP. At this time, as in the case where the read head 15R is positioned in the outermost peripheral area MOC, the MPU 60 writes the parity data of the particular inner peripheral track to another nonvolatile storage area, without writing the same to the parity sector IP located inside the recording area 11*a*.

Figure 4:
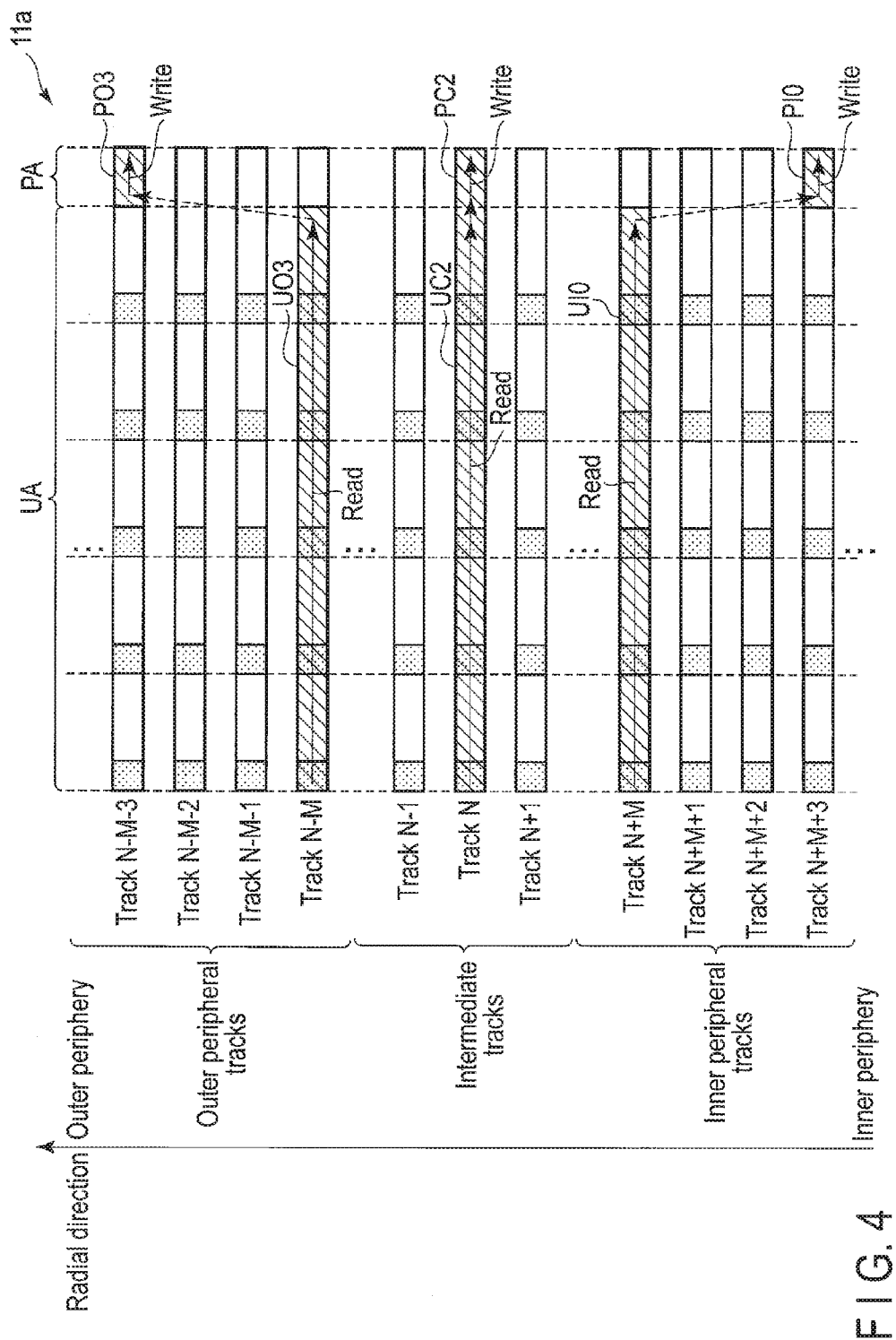
FIG. 4 is a schematic view for explaining read processing of a particular track and write processing of parity data associated with the particular track.

FIG. 4 is a schematic diagram showing read processing of a particular track and write processing of parity data associated with the particular track.

In the embodiment, the MPU 60 arranges parity sectors in the same circumferential positions of respective tracks, namely, in the positions of the same rotational angle on the disk 10. For instance, as shown in FIG. 4, in each track, the MPU 60 adds a parity sector after the last servo sector in the user-data recording area UA.

In FIG. 4, it is assumed for convenience sake of description that the RW offset OFrw is set equal between the outer and inner peripheral areas, and is set to a radial length corresponding to three tracks.

In FIG. 4, track N–M, track N–M–1, track N–M–2 and track N–M–3 represent respective tracks in the outer peripheral area. Track N–M radially adjoins track N–M–1, track N–M–1 radially adjoins track N–M–2, and track N–M–2 radially adjoins track N–M–3. Track N–M, track N–M–1, track N–M–2 and track N–M–3 each include the user-data recording area UA and the parity area PA. Assume here that the user-data recording area UA of outer peripheral track N–M is set to user-data recording area UO3, and the parity sector corresponding to user-data recording area UO3 is set to parity sector PO3. Parity sector PO3 is the last sector of the user-data recording area UA of track N–M–3. Track N–M is away from track N–M–3 by a length corresponding to three tracks. That is, track N–M is separate from track N–M–3 by a length corresponding to the RW offset.

For example, as shown in FIG. 4, when having positioned the read head 15R on track N–M, the MPU 60 reads user-data recording area UO3 of track N–M. The MPU 60 writes parity data, generated from the data of read user-data recording area UO3, to parity sector PO3 as an extension of track N–M–3.

In FIG. 4, track N–1, track N and track N+1 represent tracks included in the intermediate area. Track N–1 radially adjoins track N, and track N radially adjoins track N+1. Track N–1, track N and track N+1 each include the user-data area UA and the parity area PA. Assume here that the user-data recording area UA of intermediate track N is set to user-data recording area UC2, and a parity sector corresponding to user-data recording area UC2 is set to parity sector PC2. Parity sector PC2 is added after user-data recording area UC2 of track N.

For example, as shown in FIG. 4, when the read head 15R is positioned to track N, the MPU 60 reads user-data recording area UC2 of track N. The MPU 60 writes parity data, generated from the data of read user-data recording area UC2, to parity sector PC2 as an extension on track N.

In FIG. 4, track N+M, track N+M+1, track N+M+2 and track N+M+3 represent tracks in the inner peripheral area. Track N+M radially adjoins track N+M+1, track N+M+1 radially adjoins track N+M+2, and track N+M+2 radially adjoins track N+M+3. Track N+M, track N+M+1, track N+M+2 and track N+M+3 each include the user-data area UA and the parity area PA. Assume here that the user-data recording area UA of inner peripheral track N+M is set to user-data recording area UI0, and a parity sector corresponding to user-data recording area UI0 is set to parity sector PI0. Parity sector PI0 is added after the user-data recording area UA of track N+M+3. Track N+M is separate from track N+M+3 by a length corresponding to three tracks. That is, track N+M is separate from track N+M+3 by a length corresponding to the RW offset.

For example, in FIG. 4, when the read head 15R is positioned on track N+M, the MPU 60 reads user-data recording area UI0 of track N+M. The MPU 60 writes parity data, generated from the data of read user-data recording area UI0, to parity sector PI0 as an extension of track N+M+3.

As described above, in each area of the recording area 11*a*, the MPU 60 reads a particular track of the recording area 11*a*, then generates, from the generated data, parity data corresponding to the particular track, and writes the generated parity data to a parity sector corresponding to the particular track.

The MPU 60 can update, during read verify processing, the parity data of the parity sector corresponding to the particular track, without a seeking operation of the head 15 (more specifically, the write head 15W). During the read verify processing, the MPU 60 sequentially reads tracks in the recording area 11*a*, determines whether each track is a to-be-updated track, referring to, for example, the parity-data management table, and updates the parity data of a parity sector corresponding to the to-be-updated track.

Figure 5:
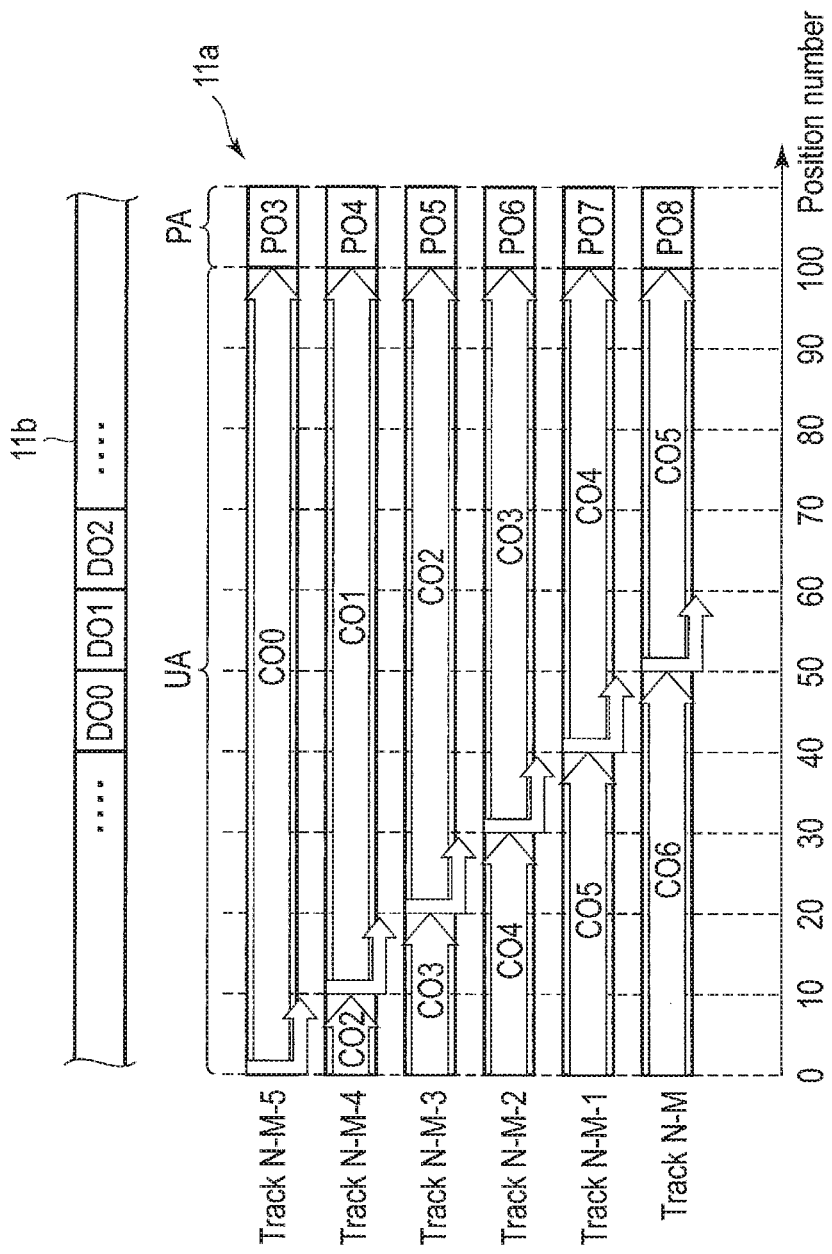
FIG. 5 is a schematic view showing the positional relationship between parity constructing areas and parity sectors in an outer peripheral area, which is assumed during sequential reading.

FIG. 5 is a schematic view showing the positional relationship between parity constructing areas and parity sectors in the outer peripheral are, which is assumed during sequential reading. FIG. 5 corresponds to the outer peripheral area of FIG. 4. Each parity constructing area includes a plurality of sectors for storing data used to generate a single parity data item.

In FIG. 5, the vertical axis represents some outer peripheral tracks in the outer peripheral area, and the horizontal axis represents position numbers that are circumferentially successive in each track. The position numbers are allocated to respective zones into which each track is circumferentially divided at regular intervals. For instance, the position numbers are allocated to respective sectors. Accordingly, the same position number in different tracks indicates the same circumferential position therein.

In FIG. 5, successive position numbers from 0 to 99 are allocated to the user-data recording area UA in each outer peripheral track. A parity area PA is provided after the user-data recording area UA, namely, provided in a position with position number 100.

Further, in the sectors other than the parity sectors in each track, i.e., in the user-data recording area UA, a sector, from which reading is started, will be hereinafter referred to as a start sector, and a sector located immediately before the start sector will be referred to as an end sector. In FIG. 5, the sector positioned at the tip of each angled arrow represents the start sector of each track.

When seeking the read head 15R from a currently read track (target track) to an adjacent track (next target track) to be read subsequently, the MPU 60 needs a particular time for the seek operation. Therefore, the position number attached to the start sector of the next target track is shifted in position by a circumferential distance corresponding to the time required for the seek operation. In FIG. 5, in each track, the position number of the start sector of the next target track is circumferentially shifted by 10 from the position number of the target track in consideration of the time for the seek operation.

In FIG. 5, parity construction area CO0 includes a plurality of sectors that store data for generating parity data DO0. Similarly, parity construction areas CO1 and CO2 include a plurality of sectors that store data for generating parity data items DO1 and DO2, respectively. Also similarly, parity construction areas CO3, CO4, CO5 and CO6 each include a plurality of sectors that store data for generating the parity data of parity sectors PO3, PO4 PO5 and PO6, respectively. The parity data of parity sectors PO7 and PO8 is generated by performing an XOR operation on the data stored in respective parity construction areas (not shown).

In track N−M−5, the start sector is in a position with position number 0. When performing read processing on track N−M−5, the MPU 60 reads sectors of from position number 0 to position number 99 in track N−M−5. By performing an XOR operation on the data of parity construction area CO0, the MPU 60 generates parity data DO0, and determines that the write head 15W is positioned outside the recording area 11a. Since, at this time, the write head 15W is positioned outside the recording area 11a, the MPU 60 can once stop the read processing to thereby write parity data DO0 to a nonvolatile storage area other than parity area PA.

After writing parity data DO0, the MPU 60 seeks the read head 15R from the start sector of track N−M−5 with position number 0, to the start sector of adjacent track N−M−4 with position number 10.

When performing read processing on track N−M−4, the MPU 60 reads sectors of track N−M−4 with position numbers 10 to 99, namely, parity construction area CO1. The MPU 60 generates parity data DO1 from the data of parity construction area CO1, and determines from the data of parity construction area CO1 that the write head 15W is positioned outside the recording area 11a. At this time, the MPU 60 can once stop the read processing to thereby write parity data DO1 to a nonvolatile storage area other than parity area PA.

After writing parity data DO1, the MPU 60 reads sectors of track N−M−4 with position numbers 0 to 10, which have not been read. At this time, the MPU 60 processes the sectors with position numbers 0 to 10 as part of subsequent parity construction area CO2.

After reading the sectors of track N−M−4 with position numbers 0 to 10, the MPU 60 seeks the read head 15R from the start sector of track N−M−4 with position number 10 to the start sector of track N−M−3 with position number 20.

When performing read processing on track N−M−3, the MPU 60 reads sectors of track N−M−4 with position numbers 0 to 10 and sectors of track N−M−3 with position numbers 20 to 99, namely, parity construction area CO2. The MPU 60 generates parity data DO2 from the data of parity construction area CO2, and determines that the write head 15W is positioned outside the recording area 11a. At this time, the MPU 60 can once stop the read processing to thereby write parity data DO2 to a nonvolatile storage area other than parity area PA.

After writing parity data DO2, the MPU 60 reads sectors of track N−M−3 with position numbers 0 to 20, which have not been read. At this time, the MPU 60 processes the sectors with position numbers 0 to 20 as part of subsequent parity construction area CO3.

After reading the sectors of track N−M−3 with position numbers 0 to 20, the MPU 60 seeks the read head 15R from the start sector of track N−M−3 with position number 20 to the start sector of track N−M−2 with position number 30.

When performing read processing on Track N−M−2, the MPU 60 reads sectors of track N−M−3 with position numbers 0 to 20 and sectors of track N−M−2 with position numbers 30 to 99, namely, parity construction area CO3. The MPU 60 generates parity data from the data of parity construction area CO3, and determines that the write head 15W is positioned within the recording area 11a. At this time, the MPU 60 can once stop the read processing to write the generated parity data to parity area PO3 where the write head 15W is positioned.

As described above, during sequential read processing, the MPU 60 can read a particular track, and can write parity data, associated with the read particular track, to a parity sector corresponding to the particular track.

For example, the MPU 60 can perform, during read verify processing, the above-described write processing only on a to-be-updated track that does not have any valid parity data, thereby updating the parity data of this track. During the read verify processing, the MPU 60 determines the to-be-updated track based on, for example, the management table associated with the parity data. The MPU 60 reads the to-be-updated track and generates parity data associated with the read track. The MPU 60 updates, to the newly generated parity data, the parity data stored in a parity sector corresponding to the to-be-updated track an updating track. At this time, the MPU 60 sets a flag indicating that the updated parity data is valid, in, for example, the management table corresponding to each parity data item.

When degraded user data has been detected, the MPU 60 performs rewrite processing on a track including the user data.

Also in the intermediate area and the inner peripheral area, the MPU 60 can execute update (write) processing using a method substantially equivalent to the above-mentioned method for the update (write) processing of parity data in the outer peripheral area.

FIG. 6 is a schematic view showing a sequential read operation example. FIG. 6 corresponds to FIG. 5. The vertical axis represents a plurality of adjacent tracks, and the horizontal axis represents cycles of tracks. One cycle indicates the entire zone of each track. FIG. 6 shows a positional relationship example between the head 15 and tracks in the outer peripheral area. In FIG. 6, UO0 represents the user-data recording area of track N−M−5, UO1 represents the user-data recording area of track N−M−4, and UO2 represents the user-data recording area of track N−M−3. Further, UO3 represents the user-data recording area of track N−M−2, UO4 represents the user-data recording area of track N−M−1, and UO5 represents the user-data recording area of track N−M.

During sequential read processing, for example, during read verify processing, the MPU 60 carries out sequential reading of a plurality of sectors with successive LBAs of from the start LBA to the last LBA. In each track, when the read head 15R has reached the parity sector of each track, the MPU 60 once stops read processing to thereby write parity data, generated from the read data of some sectors DO0, to the parity sector, using the write head 15W. After writing the parity data to the parity sector, the MPU 60 resumes the read processing using the read head 15R.

In FIG. 6, the MPU 60 sequentially reads tracks N−M−2, N−M−1 and N−M in this order.

In a first cycle, the MPU 60 reads parity construction area CO3 of track N−M−2. After reading parity construction area CO3, the MPU 60 once stops the read processing, and performs an XOR operation on the data of parity construction area CO3, thereby generating parity data associated with parity construction area CO3. The MPU 60 writes the generated parity data associated with parity construction area CO3 to parity sector PO3.

After writing the parity data to parity sector PO3, the MPU 60 seeks the read head 15R from the start sector of track N−M−2 with position number 0 to the start sector of track N−M−1 with position number 10.

In a second cycle, the MPU 60 reads parity construction area CO4 of track N−M−1. After reading parity construction area CO4, the MPU 60 once stops the read processing, and performs an XOR operation on the data of parity construction area CO4, thereby generating parity data associated with parity construction area CO4. The MPU 60 writes the generated parity data associated with parity construction area CO4 to parity sector PO4.

After writing the parity data to parity sector PO4, the MPU 60 seeks the read head 15R from the start sector of track N−M−1 with position number 10 to the start sector of track N−M with position number 20.

In a third cycle, the MPU 60 reads parity construction area CO5 of track N−M. After reading parity construction area CO5, the MPU 60 once stops the read processing, and performs an XOR operation on the data of parity construction area CO5, thereby generating parity data associated with parity construction area CO5. The MPU 60 writes the generated parity data associated to parity sector PO5.

As described above, while seeking the head 15 to respective adjacent tracks, the MPU 60 sequentially reads the sectors of tracks in accordance with their LBAs, thereby writing, to respective particular parity sectors, parity data generated parity construction area by parity construction.

Also in the intermediate area and the inner peripheral area, the MPU 60 performs substantially the same sequential read operation as the above-described one.

Further, in FIG. 6, each track may have margin areas in the user-data recording areas UA immediately before and after a parity sector, i.e., the parity area PA. The margin areas have a size determined from, for example, the time required for switching a write operation and a read operation, or from the circumferential positions of the read head 15R and the write head 15W.

Figure 7:
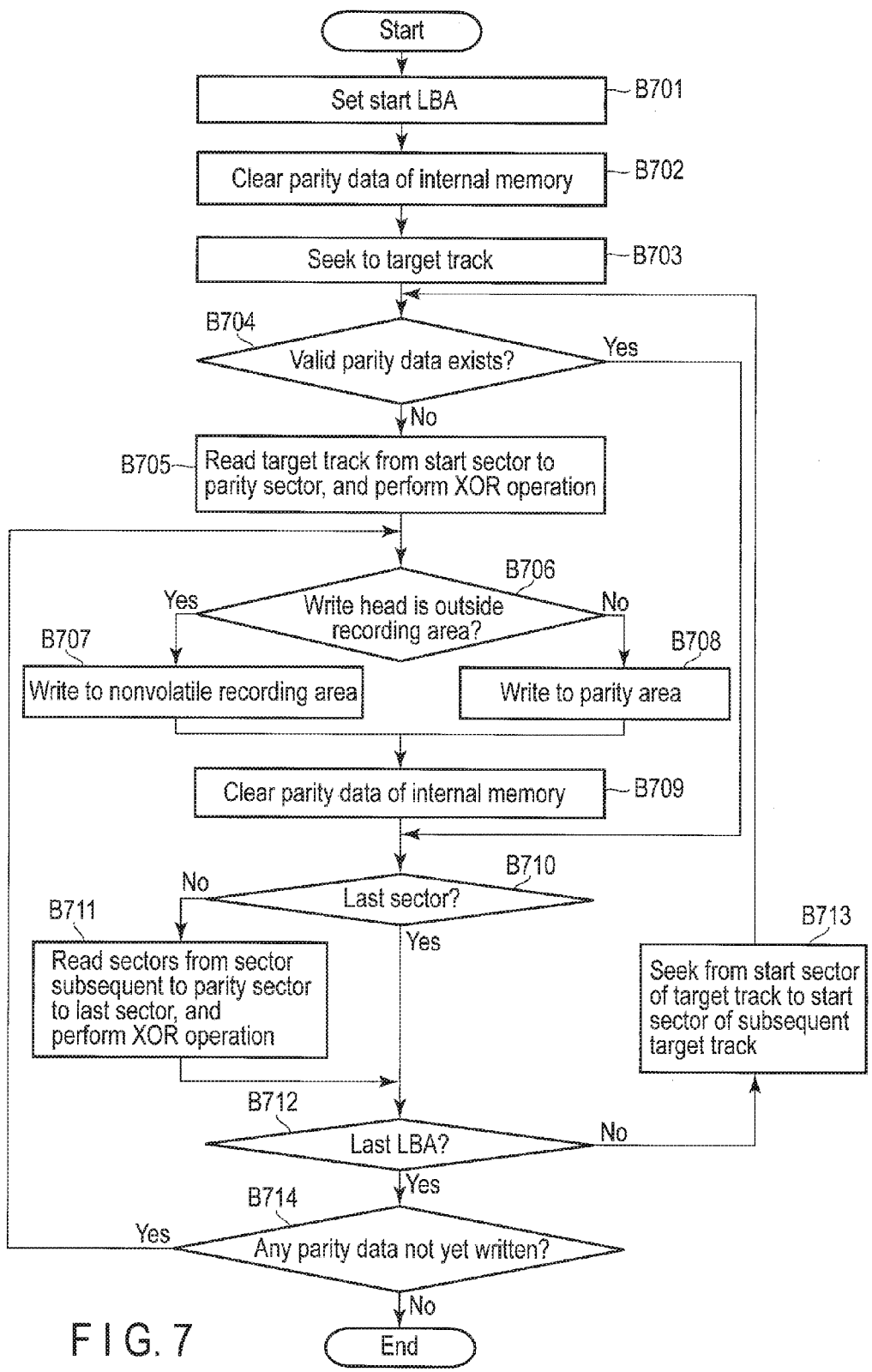
FIG. 7 is a flowchart for describing write processing in a parity sector during read verify processing.

FIG. 7 is a flowchart showing update (write) processing performed on a parity sector during read verify processing. In FIG. 7, it is assumed that the MPU 60 stores, in the parity area PA, parity data corresponding to each track of the recording area 11a.

The MPU 60 sets a start LBA for the read verify processing (B701), and clears parity data from the internal memory 52 (B702).

The MPU 60 seeks the head to a target track including a sector corresponding to the start LBA (B703).

The MPU 60 determines whether the target track has valid parity data. If determining that the target track has valid parity data (YES in B704), the MPU 60 executes B710. In contrast, if determining that the target track has no valid parity data (NO in B704), the MPU 60 reads the area ranging from the start sector of the target track to the parity sector of the same, and performs an XOR operation on the read data (B705).

The MPU 60 determines whether the write head 15W is positioned outside the recording area 11a (B706). If determining that the write head 15W is positioned outside the recording area 11a (YES in B706), the MPU 60 writes parity data resulting from the XOR operation to a nonvolatile recording area, such as the system area 11b, and the nonvolatile memory 80 (B707).

If determining that the write head 15W is positioned within the recording area 11a (NO in B706), the MPU 60 writes, with the read head 15R kept in position, the parity data to the parity area PA located on the path of the write head 15W (B708). If the parity sector located on the path of the write head 15W is a defective sector, the MPU 60 may write the parity data to a nonvolatile storage area.

The MPU 60 clears parity data from the internal memory 52 (B709).

The MPU 60 determines whether the sector read before writing data to the parity sector is the last sector of the target track (B710). If determining that the sector read before writing data to the parity sector is not the last sector of the target track (NO in B710), the MPU 60 reads sectors ranging from a sector subsequent to the parity sector to the last sector of the target track, performs an XOR operation on the read sectors (B711).

If determining that the sector read before writing data to the parity sector is the last sector of the target track (YES in B710), the MPU 60 determines whether the LBA of the last sector of the target track is the last LBA for the read verify processing (B712).

If determining that the LBA of the last sector of the target track is the last LBA (NO in B711), the MPU 60 seeks the read head 15R from the start sector of the target track to the start sector of a subsequent target track (B713), thereby proceeding to B704.

If determining that the LBA of the last sector is the last LBA (YES in B712), the MPU 60 determines whether there is parity data that is not yet written (B714).

If determining that parity data that is not written exists (YES in B714), the MPU 60 executes B706.

If determining that parity data that is not written does not exist (NO in B714), the MPU 60 finishes this processing.

According to the embodiment, during read verify processing, the magnetic disk device 1 reads a particular track, and generates parity data associated with the particular track by an XOR operation. At this time, the magnetic disk device 1 can write the generated parity data to a parity sector corresponding to the particular track.

The magnetic disk device 1 does not need seeking of the head 15 for parity data writing, and is therefore free from a rotational delay, thereby realizing efficient parity sector updating. As a result, the magnetic disk device 1 is free from read errors, and is therefore highly reliable.

Next, a description will be given of a modification of the magnetic disk device according to the embodiment. In the modification, elements like or similar to those of the above-described embodiment are denoted by similar reference numbers and symbols and are not described in detail.

Modification

In a magnetic disk device 1 according to the modification, parity sectors are set in arbitrary positions on the recording area 11a.

The MPU 60 reads a particular track, and performs an XOR operation on the read data of the particular track, thereby generating parity data associated with the particular track. Based on the RW offset OFrw, the MPU 60 writes the parity data of the particular track to a track where the write head 15W is positioned, with the read head 15R positioned on the particular track. If the RW offset OFrw is not m times (m: natural number) the track pitch, the MPU 60 slightly seeks the write head 15W to the target position of the track to which the parity data of the particular track is to be written.

Figure 8:
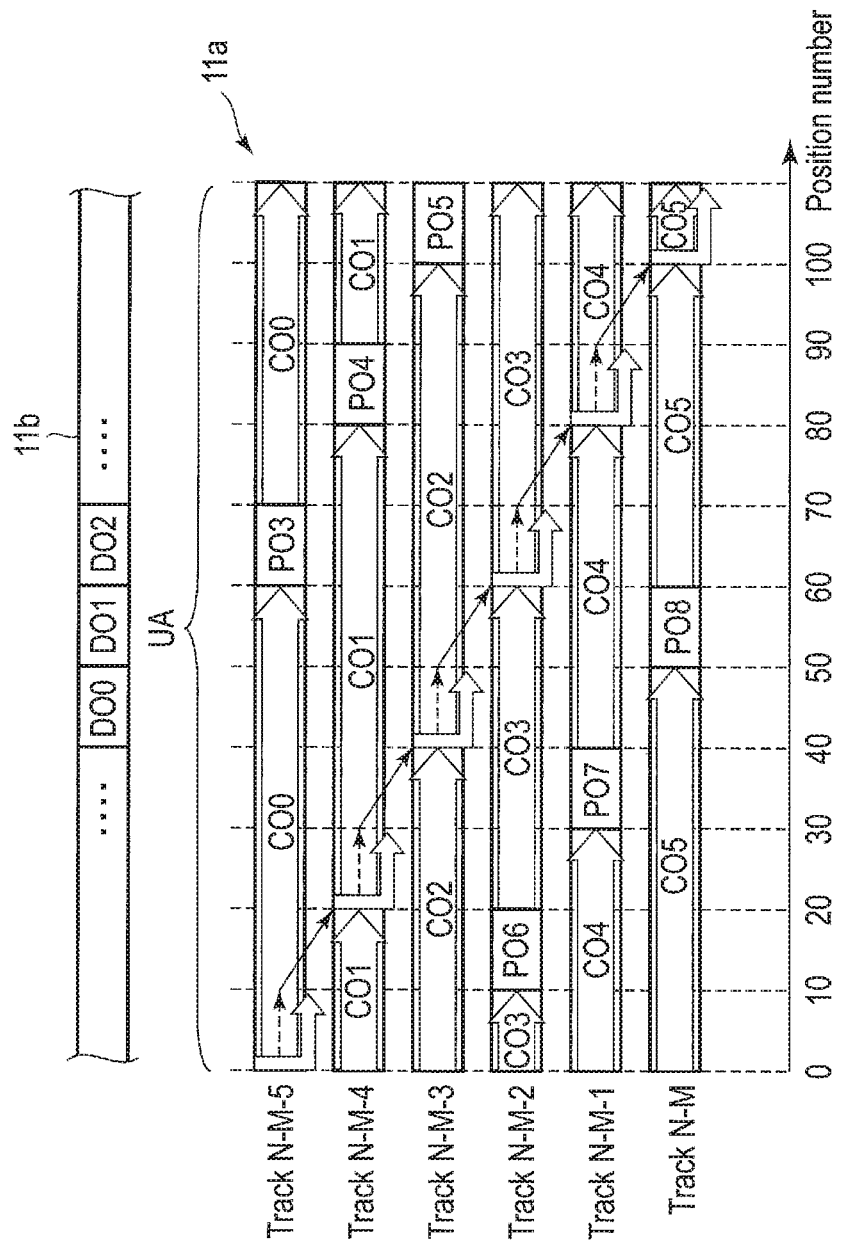
FIG. 8 is a schematic view showing the positional relationship between parity constructing areas and parity sectors in an outer peripheral area, which is assumed in a modification during sequential reading.

FIG. 8 is a schematic view showing a positional relationship example between the parity construction area and the parity sector in the outer peripheral area, which is assumed during sequential reading according to the modification. FIG. 8 corresponds to the outer peripheral area shown in FIG. 4. In FIG. 8, the RW offset OFrw is set to a radial distance corresponding to three tracks, for convenience sake, as in the case of FIG. 4.

In track N–M–5, the start sector is in a position with position number 0. When performing read processing on track N–M–5, the MPU 60 reads sectors of track N–M–5 ranging from position number 0 to position number 100, which exclude parity sector PO3, namely, parity construction area CO0.

The MPU 60 generates parity data DO0 by performing an XOR operation on the read data. At this time, since the MPU 60 determines that the write head 15W is positioned outside the recording area 11a, it once stops the read processing, and writes generated parity data DO0 to another nonvolatile recording area, such as the system area 11b or the nonvolatile memory 80. For instance, at this time, the MPU 60 writes parity data DO0 during a period required for the read head 15R to circumferentially move by an amount corresponding to, for example, ten position numbers.

After writing parity data DO0, the MPU 60 seeks the read head 15R from the sector of track N–M–5 with position number 10 to the start sector of adjacent track N–M–4 with position number 20.

When performing read processing on track N–M–4, the MPU 60 reads the sectors of track N–M–4 with position numbers 0 to 100 that exclude parity sector PO4, namely, parity construction area CO1.

By performing an XOR operation on the read data, the MPU 60 generates parity data DO1 and determines that the write head 15W is positioned outside the recording area 11a. After that, the MPU 60 once stops the read processing, and writes generated parity data DO1 to another nonvolatile recording area. At this time, the MPU 60 writes parity data DO1 during a period required for the read head 15R to circumferentially move by an amount corresponding to, for example, ten position numbers.

After writing parity data DO1, the MPU 60 seeks the read head 15R from the sector of track N–M–4 with position number 30 to the start sector of adjacent track N–M–3 with position number 40.

When performing read processing on track N–M–3, the MPU 60 reads the sectors of track N–M–3 with position numbers 0 to 100 that exclude parity sector PO5, namely, parity construction area CO2.

By performing an XOR operation on the read data, the MPU 60 generates parity data DO2 and determines that the write head 15W is positioned outside the recording area 11a. After that, the MPU 60 once stops the read processing, and writes generated parity data DO2 to another nonvolatile recording area. At this time, the MPU 60 writes parity data DO2 during a period required for the read head 15R to circumferentially move by an amount corresponding to, for example, ten position numbers.

After writing parity data DO2, the MPU 60 seeks the read head 15R from the sector of track N–M–3 with position number 50 to the start sector of adjacent track N–M–2 with position number 60.

When performing read processing on track N–M–2, the MPU 60 reads the sectors of track N–M–2 with position numbers 0 to 100 that exclude parity sector PO6, namely, parity construction area CO3.

The MPU 60 generates parity data from the data of parity construction area CO3. The MPU 60 can once stop the read processing, and write the generated parity data to parity sector PO3 where the write head 15W is positioned. At this time, the MPU 60 writes the generated parity data during a period required for the read head 15R to circumferentially move by an amount corresponding to, for example, ten position numbers.

After writing the parity data, the MPU 60 seeks the read head 15R from the sector of track N–M–2 with position number 70 to the start sector of adjacent track N–M–1 with position number 80.

As described above, during sequential read processing, the MPU 60 can read a particular track and write parity data associated with the particular track to an arbitrary position in the user-data area UA, where the write head 15W is positioned, with the read head 15R positioned on the particular track.

For example, during read verify processing, in accordance with the above-mentioned write processing, the MPU 60 can update the parity data written to an arbitrary position in the user-data area UA of only a to-be-updated track without valid parity data.

Moreover, also in the intermediate and inner peripheral areas, the MPU 60 can perform parity data update (write) processing by substantially the same method as employed for the parity data update (write) processing in the outer peripheral area.

If the RW offset OFrw is not n times (n: natural number) the track pitch, the MPU 60 can seek the write head 15W to a target position on a track, where the parity data of a particular track is to be written, after the read head 15R has read the particular track.

Figure 9:
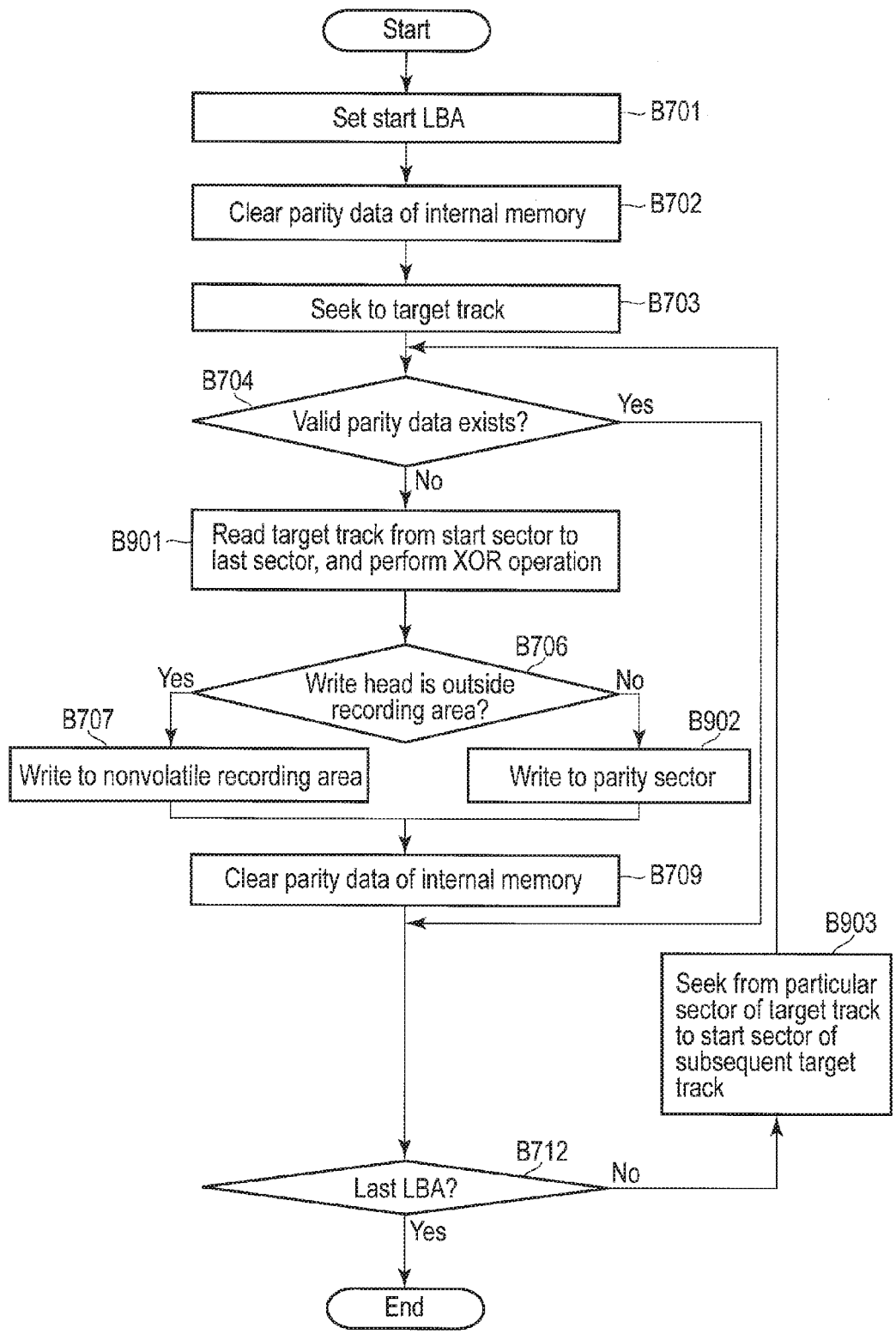
FIG. 9 is a flowchart showing write processing in a parity sector during read verify processing.

FIG. 9 is a flowchart showing write processing involved in the read verify processing according to the modification. In FIG. 9, it is assumed that the MPU 60 stores, in the parity area PA, parity data corresponding to each track of the recording area 11a.

The MPU 60 sets a start LBA for the read verify processing (B701), and clears the parity data stored in the internal memory 52 (B702).

The MPU 60 seeks a head to a target track including a sector corresponding to the start LBA (B703).

The MPU 60 determines whether parity data valid for the target track exists (B704). If determining that parity data valid for the target track exists (YES in B704), the MPU 60 executes B712. In contrast, if determining that parity data valid for the target track does not exist (NO in B704), the MPU 60 reads sectors ranging from the start sector of the target track to the end sector of the same, and performs an XOR operation associated with the read data (B901).

The MPU 60 determines whether the write head 15W is positioned outside the recording area 11a (B706). If determining that the write head 15W is positioned outside the recording area 11a (YES in B706), the MPU 60 writes, to the nonvolatile recording area, parity data resulting from the XOR operation (B707).

If determining that the write head 15W is positioned within the recording area 11a (NO in B706), the MPU 60 writes parity data to a parity sector provided in an arbitrary position in the user-data area UA, after performing a seek operation for correcting a positional error, if necessary (B902). This is because when the read head 15R is fixed, the write head 15W may radially slightly deviate from a sector that stores user data. If a parity sector located on the path of the write head 15W is a defective sector, the MPU 60 may write the parity data to a nonvolatile storage area.

The MPU 60 clears parity data from the internal memory 52 (B709).

The MPU 60 determines whether the LBA of the last sector of the target track is the last LBA (B712). If determining that the LBA of the last sector of the target track is not the last LBA (NO in B712), the MPU 60 seeks the read head 15R from a particular sector of the target track to the start sector of a subsequent track (B903), and proceeds to B704. The particular sector is, for example, a sector where the read head 15R is positioned after the parity data generated from the read data is written.

If determining that the LBA of the last sector of the target track is the last LBA (YES in B712), the MPU 60 finishes the processing.

In the embodiment, the magnetic disk device 1 can perform, during read verify processing, rewriting processing of a parity sector located in an arbitrary position in the storage area 11a. Therefore, the magnetic disk device 1 can update parity sectors efficiently, without providing a parity area in the disk 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a first recording area;
a head comprising a write head configured to write data to the disk, and a read head configured to read data from the disk; and
a controller configured to set particular areas in same circumferential positions on tracks which are consecutively arranged radially in the first recording area, each of the particular areas including data areas which are consecutively arranged radially, to read data from a first user area, which is an area other than a first data area within the data areas located in a first track of the tracks, to generate first parity data based on data read from the first user area, and to write the first parity data in any one of the data areas.

2. The magnetic disk of claim 1, wherein the controller generates the first parity data based on data read from a first area, the first area being an area ranging from a first position of the first user area to a second position of the first user area which is located immediately before the first data area, and writes the generated first parity data to any one of the data areas when the read head reaches the first data area.

3. The magnetic disk of claim 2, wherein the controller is configured to read a second area after writing the first parity data in any one of the data areas, the second area being an area ranging from a third position of the first user area immediately after the first data area to the first position, to seek the read head to a second track of the tracks, to read a third area ranging from a fourth position of a second user area, which is an area other than a second data area within the data areas, to a fifth position of the second user area located immediately before the second data area, to generate second parity data based on data read from the second area and the third area, and to write the second parity data in any one of the data areas when the read head reaches the second data area.

4. The magnetic disk of claim 1, wherein after positioning the read head to the first track and reading the first user area, the controller writes the parity data to the second data area in the data areas where the write head is located in a state in which the read head is positioned to the first track.

5. The magnetic disk of claim 1, wherein when detecting that the write head is positioned outside the first recording area, the controller writes the first parity data to a nonvolatile recording area other than the first recording area.

6. A magnetic disk device comprising:
a disk including a first recording area;
a head comprising a write head configured to write data to the disk, and a read head configured to read data from the disk; and
a controller configured to position the read head on a first track included in the first recording area, and to causes the write head to generate first parity data in a particular area set along a radial direction of the first recording area, based on data read from a first user area, which is an area other than the particular area of the first track, and to write the first parity data to the particular area the write head being positioned based on a position of the read head that reads the first track.

7. The magnetic disk device of claim 6, wherein the controller writes the first parity data to a first data area in the particular area, and starts seeking of the read head to a second track adjacent to the first track along a radius of the disk after writing to the first data area.

8. The magnetic disk device of claim 6, wherein the controller generates the first parity data based on data read from a first area ranging from a first position of the first user area to a second position of the first user area which is located immediately before the particular area of the first track, and writes the first parity data to a first data area of the particular area when the read head reaches the particular area of the first track.

9. The magnetic disk device of claim 8, wherein the controller reads a second area after writing the first parity data to the first data area, the second area being an area ranging from a third position of the first user area immediately after the particular area of the first track to the first position, reads a third area, which is an area ranging from a fourth position of a second user area other than the particular area of the second track to a fifth position of the second user area located immediately before the particular area of the second track, generates second parity data based on data read from the second area and the third area, and writes the generated second parity data to a second data area of the particular area when the read head reaches the particular area of the second track.

10. The magnetic disk device of claim 9, wherein the controller seeks the read head to the fourth position set in accordance with a seek time required for seeking from the first position of the first track to the second track.

11. The magnetic disk device of claim 6, wherein when detecting that the write head is positioned outside the first recording area, the controller writes the first parity data to a nonvolatile memory recording area other than the first recording area of the disk.

12. A method for write processing of parity data for use in a magnetic disk device comprising a disk including a first recording area, and a head comprising a write head configured to write data to the disk, and a read head configured to read data from the disk, the method comprising:

setting particular areas in same circumferential positions on tracks which are consecutively arranged radially in the first recording area, each of the particular areas including data areas which are consecutively arranged radially;

reading data from a first user area, which is an area other than a first data area within the data areas located in a first track of the tracks;

generating first parity data based on data read from the first user area; and writing the first parity data to the particular area.

13. The method of claim 12, further comprising:

generating the first parity data based on data read from a first area, the first area being an area ranging from a first position of the first user area to a second position of the first user area which is located immediately before the first data area; and writing the generated first parity data to the particular area when the read head reaches the first data area.

14. The method of claim 13, further comprising:

reading a second area after writing the first parity data to the particular area, the second area being an area ranging from a third position of the first user area immediately after the first data area to the first position;

moving the read head to a second track of the tracks;

reading a third area ranging from a fourth position of a second user area, which is an area other than a second data area within the data areas, to a fifth position of the second user area located immediately before the second data area;

generating second parity data based on data read from the second area and the third area; and writing the generated second parity data in the particular area when the read head reaches the second data area.

15. The method of claim 12, further comprising:

positioning the read head to the first track; and writing the parity data to the second data area in the data areas where the write head is located in a state in which the read head is positioned to the first track after reading the first user area.

16. The method of claim 12, wherein when it is detected that the write head is positioned outside the first recording area, the first parity data is written to a nonvolatile recording area other than the first recording area.

* * * * *